United States Patent [19]

Lin

[11] Patent Number: 5,921,267
[45] Date of Patent: Jul. 13, 1999

[54] WATER LEVEL CONTROL DEVICE

[76] Inventor: Lun Huei Lin, No. 25, La. 209, Nan Men Rd., Tainan City, Taiwan

[21] Appl. No.: 08/933,062

[22] Filed: Sep. 18, 1997

[51] Int. Cl.$^6$ ....................................................... F04F 10/00
[52] U.S. Cl. ........................................ 137/136; 137/590.5
[58] Field of Search .................................... 137/132, 133, 137/136, 138, 139, 144, 153, 590.5

[56] References Cited

U.S. PATENT DOCUMENTS

| | | | |
|---|---|---|---|
| 415,911 | 11/1889 | Hawley | 137/139 X |
| 485,759 | 11/1892 | Field | 137/138 |
| 833,150 | 10/1906 | Attenhofer | 137/590.5 |
| 931,453 | 8/1909 | Miller | 137/138 |
| 1,190,604 | 7/1916 | Stary | 137/139 |
| 1,271,813 | 7/1918 | Walker | 137/139 |
| 1,380,086 | 5/1921 | Wares | 137/139 |
| 1,752,620 | 4/1930 | Swindin | 137/138 X |
| 1,826,282 | 10/1931 | Moise | 137/138 |
| 3,972,966 | 8/1976 | Lund et al. | 137/139 X |

*Primary Examiner*—John Rivell
*Attorney, Agent, or Firm*—Bacon & Thomas

[57] ABSTRACT

A water level control device including a cylindrical casing which has a bottom open end connected to a drain port of a water reservoir, a top open end, a plurality of longitudinally extended projecting rods spaced around its top open end, and a plurality of through holes spaced around the periphery at different elevations near its top open end; a socket mounted around the top open end of the cylindrical casing and defining a plurality of gaps through which water and air are allowed to pass from the water reservoir into the inside of the cylindrical casing; a hood covered around the socket and supported on the longitudinal projecting rods of the cylindrical casing, the hood defining a plurality of gaps through which water and air are allowed to pass from the water reservoir into the gaps defined within the socket, the hood having a downwardly extended bumper suspending in the top open end of the cylindrical casing; and a collar mounted within the top open end of the cylindrical casing at a lower elevation than the through holes of the cylindrical casing and adapted to cause a turbulent flow of water when water flows from the water reservoir through the gaps within the hood and the socket into the inside of the cylindrical casing, the collar having a curved top end arranged along bottom sides of the through holes of the cylindrical casing.

5 Claims, 7 Drawing Sheets

WATER LEVEL CONTROL DEVICE

BACKGROUND OF THE INVENTION

The present invention relates to a water level control device for automatically regulating the level of water in a water reservoir, and more particularly to such a water level control device which produces a low pressure center to induce a syphonic action in drawing water away from the water reservoir when the level of water surpasses a predetermined range.

Regular water level control devices for automatically regulating the level of water in a water reservoir are commonly comprised of a float which automatically closes/opens a drain port of the water reservoir subject to the level of water in the water reservoir, and a water pump which is automatically controlled to pump water into the water reservoir when the water level in the water reservoir drops below a predetermined low level. There is also known a water level control device which uses a syphonic action to control the level of water. However, this structure of water level control device cannot eliminate the formation of air bubbles from the syphonic action, therefore water level cannot be quickly regulated as desired.

SUMMARY OF THE INVENTION

According to one aspect of the present invention, the water level control device comprises a cylindrical casing which has a bottom open end connected to a drain port of a water reservoir, a top open end, a plurality of longitudinally extended projecting rods spaced around its top open end, and a plurality of through holes spaced around the periphery at different elevations near its top open end; a socket mounted around the top open end of the cylindrical casing and defining a plurality of gaps through which water and air are allowed to pass from the water reservoir into the inside of the cylindrical casing; a hood covered around the socket and supported on the longitudinal projecting rods of the cylindrical casing, the hood defining a plurality of gaps through which water and air are allowed to pass from the water reservoir into the gaps defined within the socket, the hood having a downwardly extended bumper suspending in the top open end of the cylindrical casing; and a collar mounted within the top open end of the cylindrical casing at a lower elevation than the through holes of the cylindrical casing and adapted to cause a turbulent flow of water when water flows from the water reservoir through the gaps within the hood and the socket into the inside of the cylindrical casing, the collar having a curved top end arranged along bottom sides of the through holes of the cylindrical casing. According to another aspect of the present invention, spiral threads are made inside the cylindrical casing and the collar for causing a turbulent flow of water in producing a syphonic action when water flows from the water reservoir through the gaps within the hood and the socket into the inside of the cylindrical casing.

DETAILED DESCRIPTION OF THE PREFERRED EMBODIMENT

Figure 1:
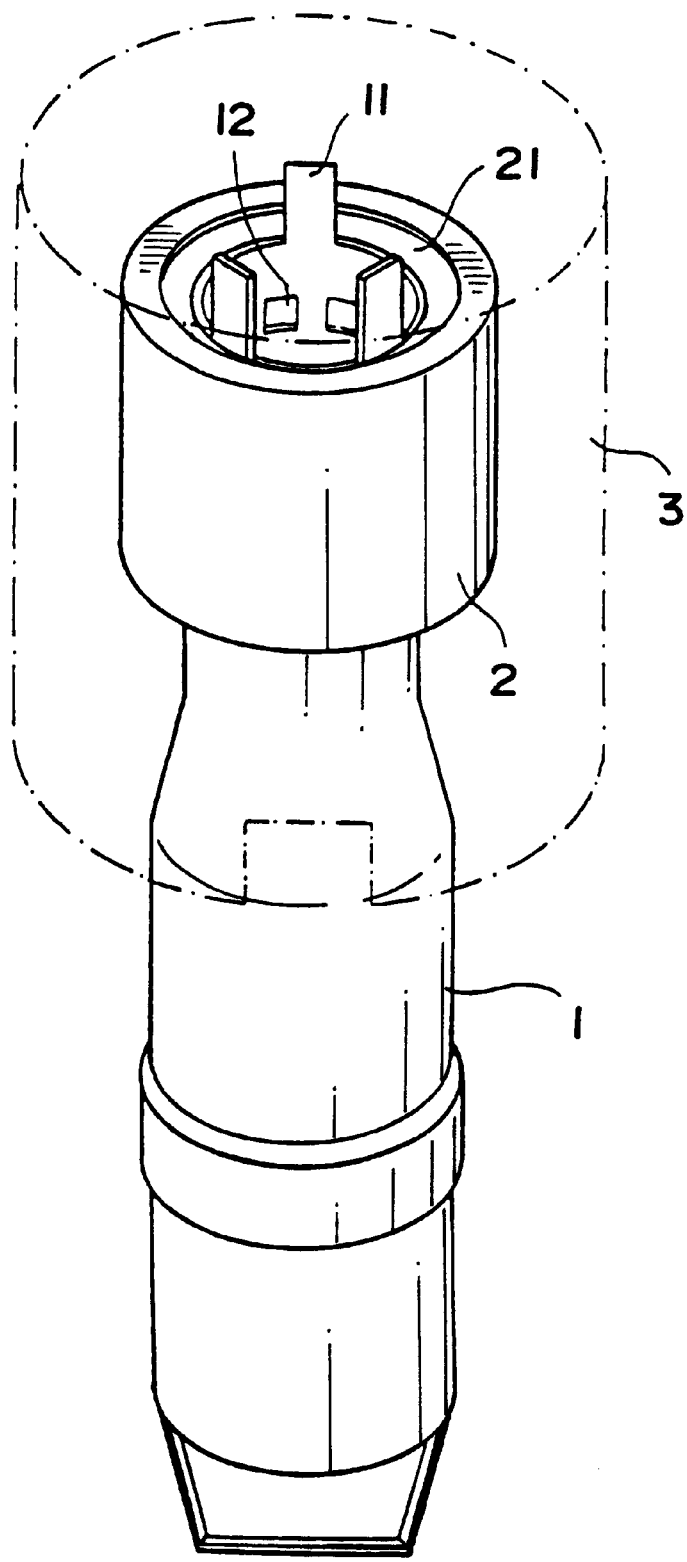
FIG. 1 is a perspective view of a water level control device according to one embodiment of the present invention.
Figure 2:
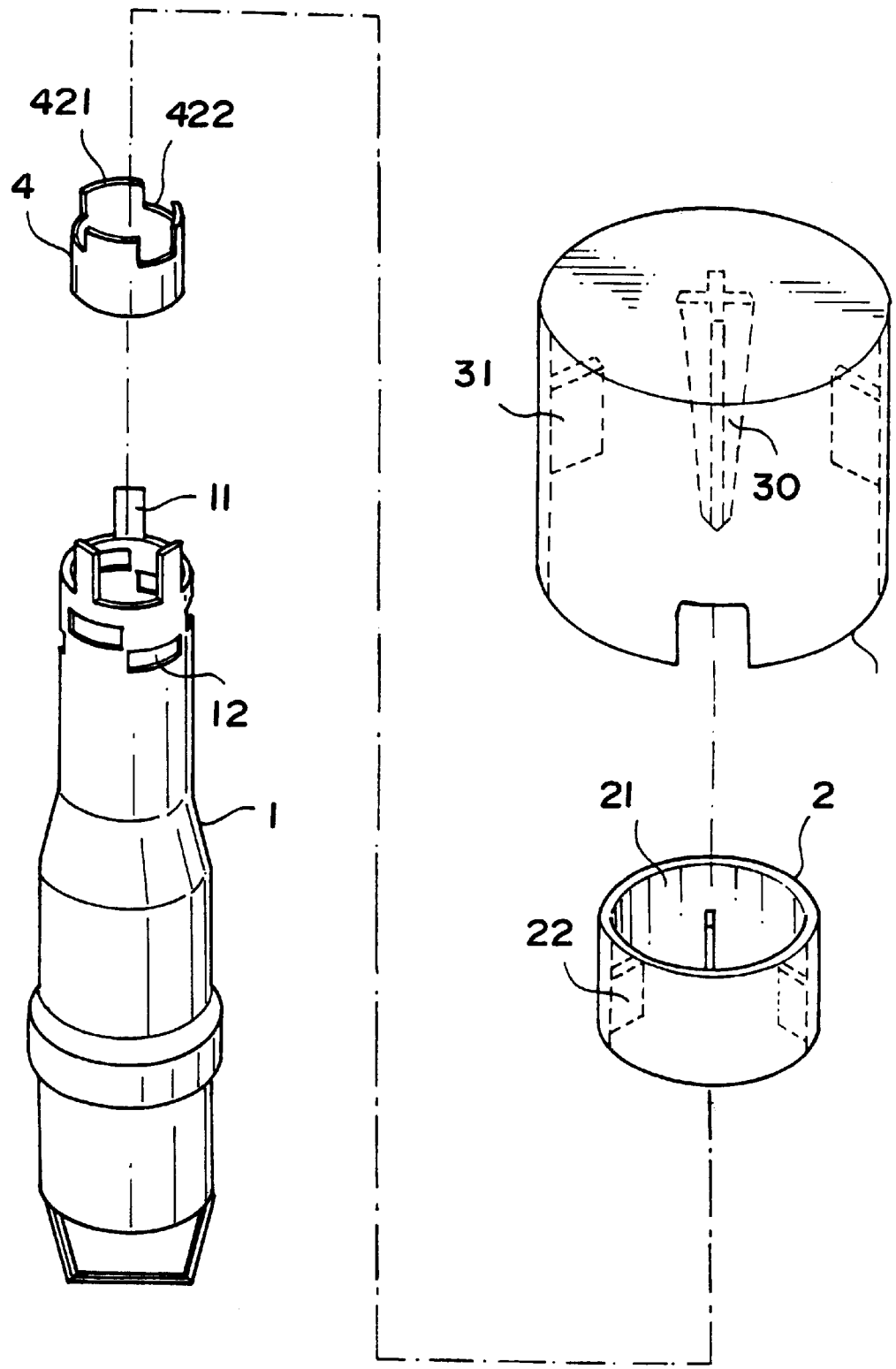
FIG. 2 is an exploded view of the water level control device shown in FIG. 1.
Figure 3:
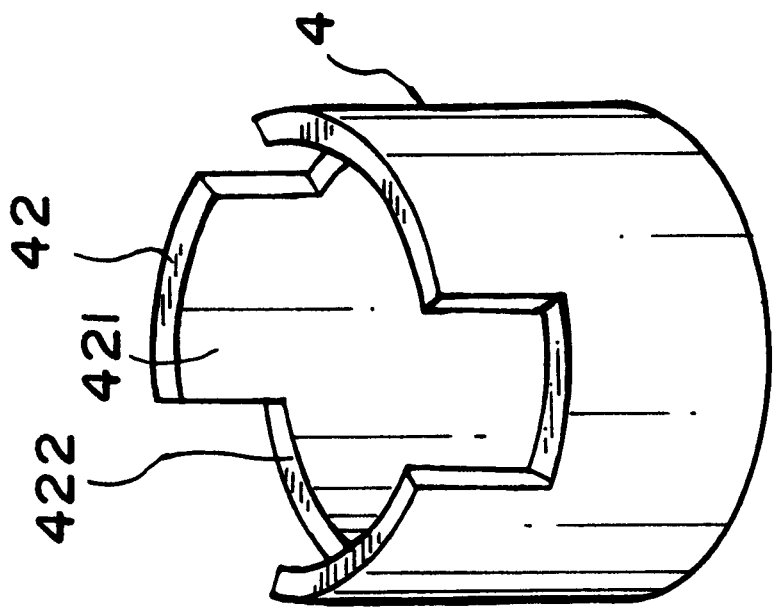
FIG. 3 is an elevational view in an enlarged scale of the collar of the water level control device shown in FIG. 2.

Referring to FIGS. 1, 2 and 3, a water level control device in accordance with the present invention is generally comprised of a cylindrical casing 1, a socket 2, a hood 3, and a collar 4.

The cylindrical casing 1 comprises a plurality of projecting rods 11 longitudinally extended from its one end namely the top end, and a plurality of through holes 12 spaced around the periphery at different elevations near its top end. The socket 2 is mounted around the top end of the cylindrical casing 1, having a center through hole 21 which receives the top end of the cylindrical casing 1, and a plurality of inward retaining flanges 22 respectively clamped on the periphery of the cylindrical casing 1 to secure the socket 2 to the cylindrical casing 1 on the outside. When the cylindrical casing 1 and the socket 2 are fastened together, the top end of the socket 2 is disposed in flush with the top ends of the longitudinal projecting rods 11 of the cylindrical casing 1. The hood 3 is a round cap covered around the socket 2 and supported on the longitudinal projecting rods 11 of the cylindrical casing 1, having a downwardly extended bumper 30 inserted into the top end of the cylindrical casing 1, and a plurality of inward retaining flanges 31 respectively clamped on the periphery of the socket 2. The collar 4 is mounted within the top end of the cylindrical casing 1 at a lower elevation than the through holes 12, having top and bottom end edges 42;44 respectively sloping inwards toward its longitudinal central axis. The top end of the collar 4 is comprised of a plurality steps 421;422 alternatively arranged at different elevations. When the collar 4 is mounted within the cylindrical casing 1, the steps 421;422 are respectively arranged along the bottom sides of the through holes 12 of the cylindrical casing 1.

Figure 4:
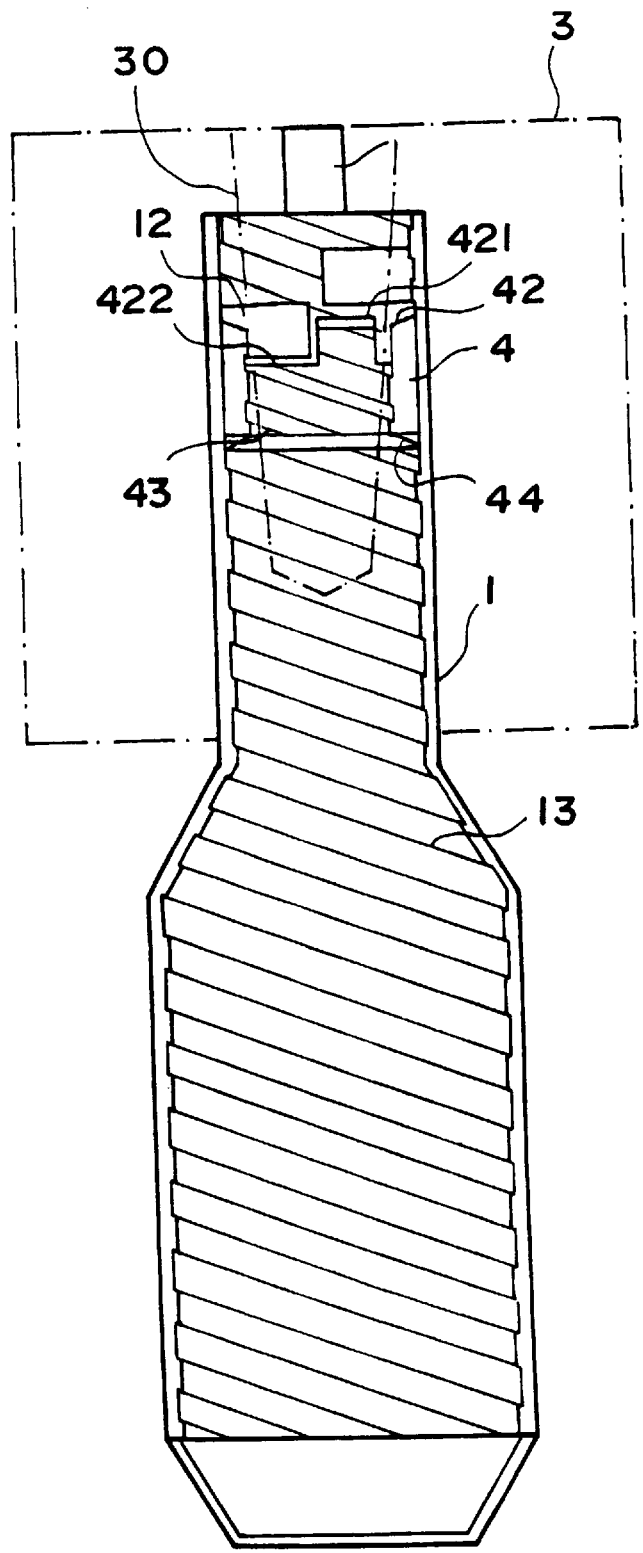
FIG. 4 is a longitudinal view in section of FIG. 1.

Referring to FIG. 4, when the water level control device is assembled, the collar 4 is fixed to the inside of the cylindrical casing 1 below the through holes 12 with the steps 421;422 of its top end edge 42 closely attached to the inside wall of the cylindrical casing 1 along the bottom sides of the through holes 12, and a water gate is defined within the hood 3 and the top open side of the cylindrical casing 1 above the elevations of the through holes 12. Therefore, the gate and the through holes 12 form an upper water guide port and a lower water guide port. When the cylindrical casing 1 is mounted in a water reservoir and the water level in the water reservoir is increased over the elevation of the water level control device, water immediately flows to the inside of the cylindrical casing 1 through the aforesaid upper water guide port and lower water guide port. When water flows into the inside of the cylindrical casing 1, it is forced by the downwardly extended bumper 30 of the hood 3 and the sloping top and bottom end edges 42;44 of the collar 4 to form a turbulent flow, thereby causing a low pressure center to be produced inside the cylindrical casing 1 for permitting inside air to be carried with the turbulent flow of water away from the cylindrical casing 1 and the hood 3 by means of a syphonic action. Further, threads 13;43 are respectively made on the inside of the cylindrical casing 1 and the collar 4 which facilitate the formation of a turbulent flow in the cylindrical casing 1.

Figure 6:
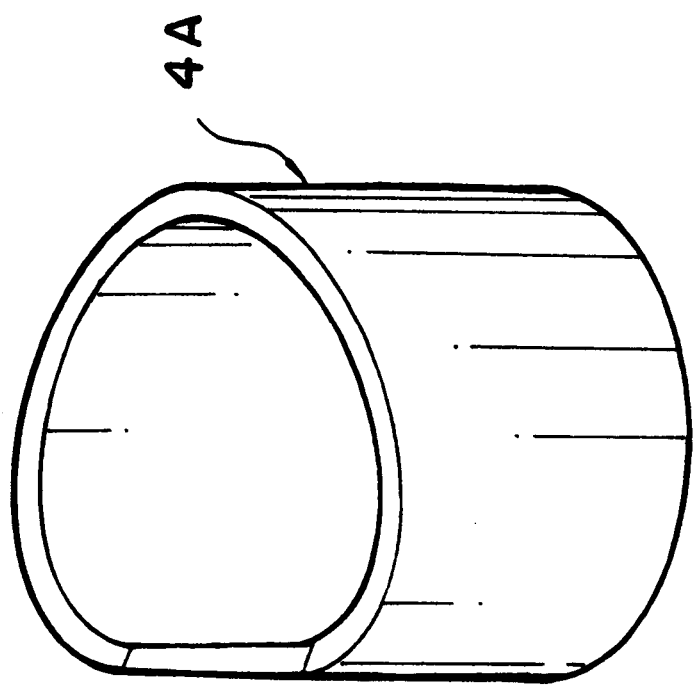
FIG. 6 is an elevational view in an enlarged scale of the collar of the water level control device shown in FIG. 5.
Figure 5:
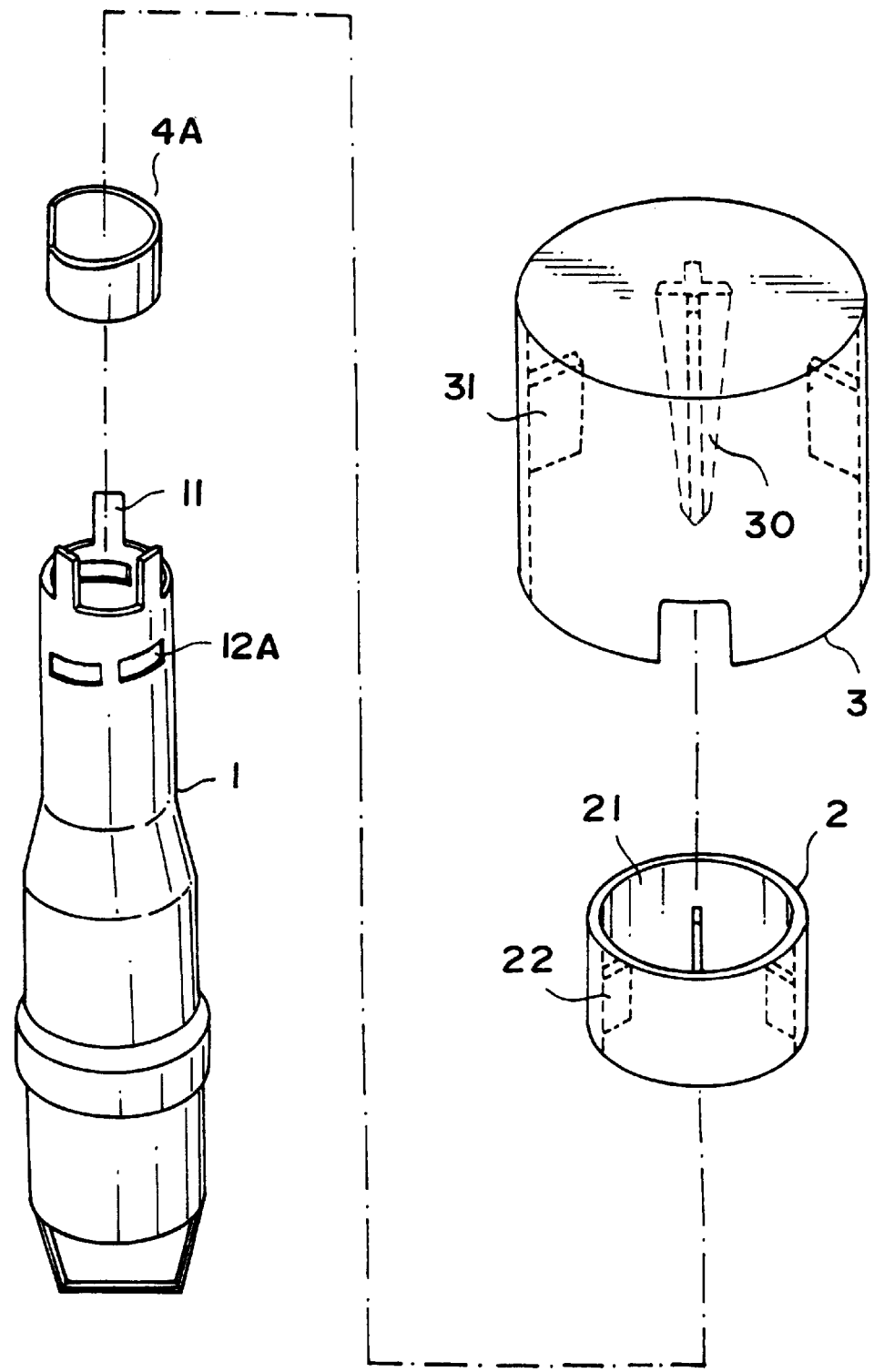
FIG. 5 is an exploded view of an alternate form of the present invention.
Figure 7:
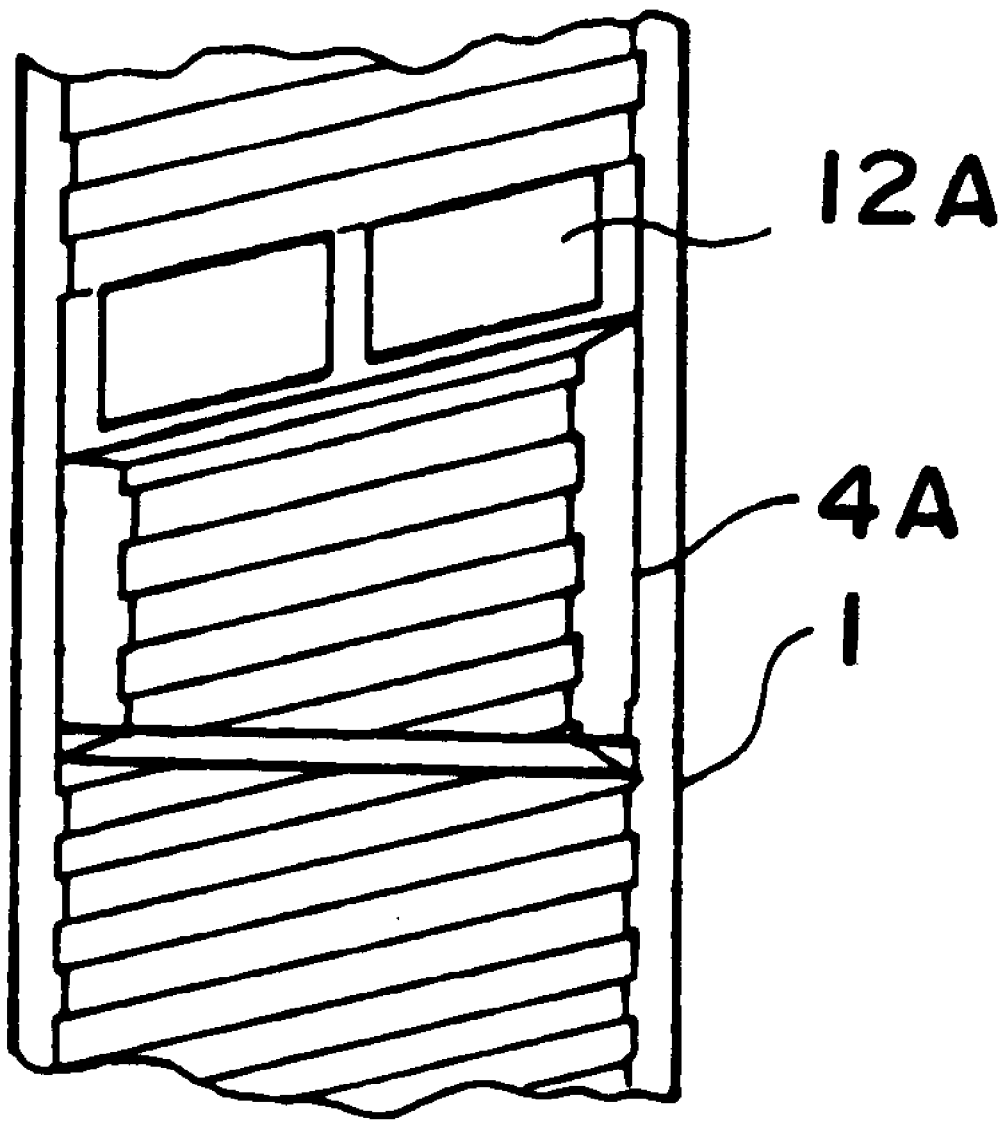
FIG. 7 is a sectional view of a part of the water level control device shown in FIG. 5, showing the collar fastened to the inside of the cylindrical casing below the through holes.
Figure 8D:
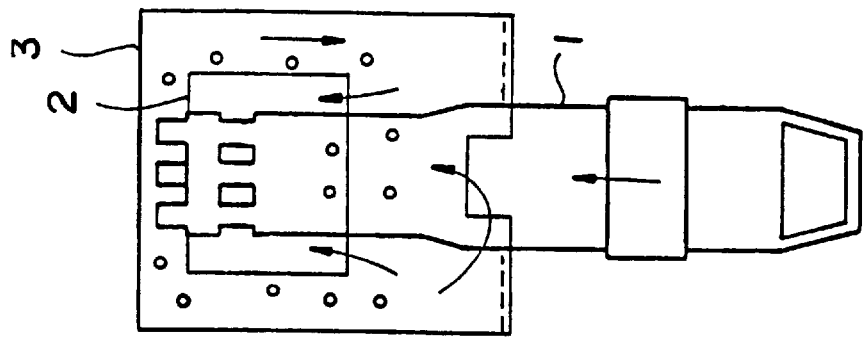
FIGS. 8a–8d explain the formation of the syphonic action according to the present invention.
Figure 8C:
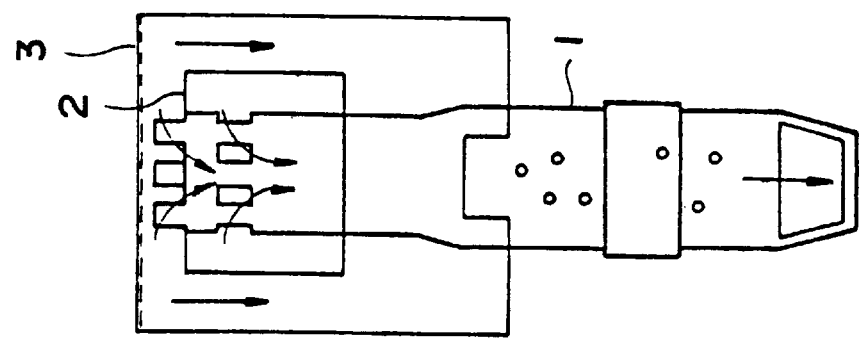
Figure 8B:
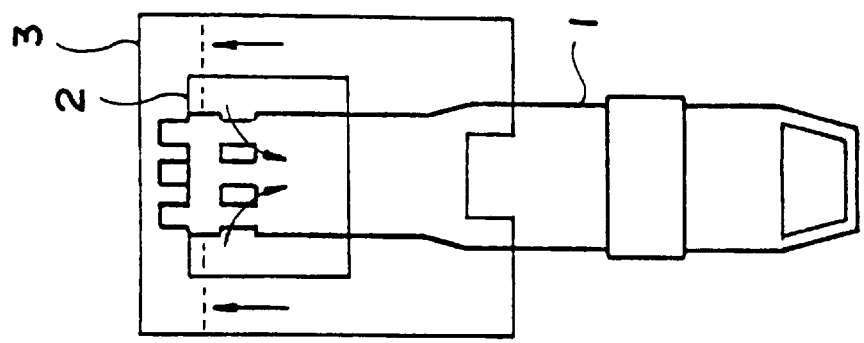
Figure 8A:
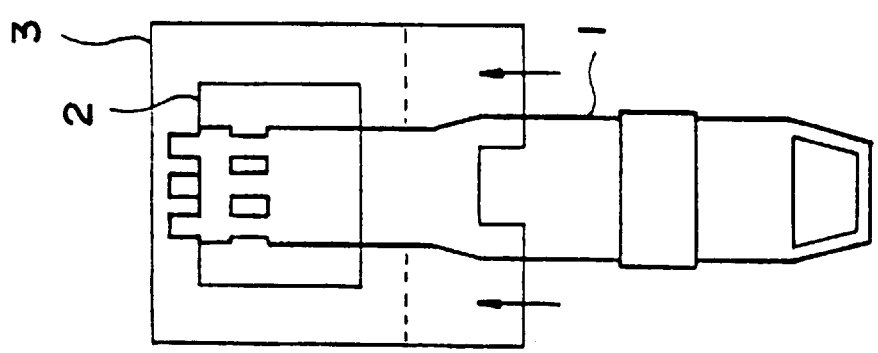

FIGS. 5, 6 and 7 show an alternate form of the present invention, in which the through holes 12A of the cylindrical casing 1 are spaced from one another along a spiral way around the periphery of the cylindrical casing 1; the collar 4A has a spiral top end edge arranged along the bottom sides of the through holes 12A of the cylindrical casing 1.

Referring to FIG. 8 and FIG. 4 again, the formation of the aforesaid syphonic action is outlined hereinafter. When the water level keeps increasing (see FIG. 8A), and water immediately flows through the through holes 12 into the inside of the cylindrical casing 1 when the water level surpasses the water gate defined within the hood 3 and the top open side of the cylindrical casing 1 (see FIG. 8B), causing a turbulent flow of water to be produced, and therefore a low pressure center is produced on the inside of the cylindrical casing 1 to draw air out of the cylindrical casing 1 through its bottom end (see FIG. 8C). When the water level surpasses the elevation of the longitudinal projecting rods 11 of the cylindrical casing 1, the whole space within the hood 3 and the cylindrical casing 1 are fully occupied by downward turbulent flow of water, permitting water to be quickly carried away from the cylindrical casing 1, and therefore the water level in the water reservoir is quickly reduced below the elevations of the through holes 12 of the cylindrical casing 1 (see FIG. 8D).

When the water level in the water reservoir drops below the bottom edge of the hood 3, outside air is drawn into the inside of the cylindrical casing 1 and water is stopped from flowing into the inside of the cylindrical casing 1, and therefore the syphonic action is stopped. When the syphonic action is stopped, the water level in the water reservoir is gradually increased again, and the aforesaid process is repeated again and again, and therefore the water level is automatically regulated.

While only one embodiment of the present invention has been shown and described, it will be understood that various modifications and changes could be made thereunto without departing from the spirit and scope of the invention disclosed.

What the invention claimed is:

1. A water level control device mounted in a water reservoir and connected to a drain port for automatically controlling the water level of the water reservoir, comprising:

a cylindrical casing having a bottom open end connected to the drain port, a top open end, a plurality of longitudinally extended projecting rods spaced around said top open end, and a plurality of through holes spaced around the periphery at different elevations near said top open end;

a socket mounted around the top open end of said cylindrical casing and defining a plurality of gaps through which water and air are allowed to pass from said water reservoir into the top end of said cylindrical casing;

a hood covered around said socket and supported on the longitudinal projecting rods of said cylindrical casing, said hood defining a plurality of gaps through which water and air are allowed to pass from said water reservoir into the gaps defined within said socket, said hood having a downwardly extended bumper suspending in the top open end of said cylindrical casing; and a collar mounted within the top open end of said cylindrical casing at a lower elevation than the through holes of said cylindrical casing and adapted to cause a turbulent flow of water when water flows from said water reservoir through the gaps within said hood and said socket into the top open end of said cylindrical casing, said collar having a curved top end arranged along bottom sides of the through holes of said cylindrical casing.

2. The water level control device of claim 1, wherein said cylindrical casing has a threaded inside wall adapted to cause a turbulent flow of water when water flows from said water reservoir through the gaps within said hood and said socket into the top open end of said cylindrical casing.

3. The water level control device of claim 1, wherein said collar has a threaded inside wall adapted to cause a turbulent flow of water when water flows from said water reservoir through the gaps within said hood and said socket into the top open end of said cylindrical casing.

4. The water level control device of claim 1, wherein the through holes of said cylindrical casing are arranged at different elevations along a spiral way around the periphery of said cylindrical casing.

5. The water level control device of claim 4, wherein said collar has a spiral top edge arranged inside said cylindrical casing along said spiral way.

\* \* \* \* \*